United States Patent Office 3,769,250
Patented Oct. 30, 1973

3,769,250
EPOXY HYDRAULIC CEMENT COMPOSITION
Otho Leroy Nikles, Jr., Toms River, N.J., assignor to Resyn Corporation, Linden, N.J.
No Drawing. Filed Sept. 10, 1970, Ser. No. 71,259
The portion of the term of the patent subsequent to Sept. 11, 1990, has been disclaimed
Int. Cl. C04b 7/56
U.S. Cl. 260—29.2 EP     20 Claims

ABSTRACT OF THE DISCLOSURE

The invention relates to a hydraulic cement composition which has admixed therein an aqueous epoxy emulsion composition of an epoxy resin and an emulsifying and curing agent for the resin in amount sufficient to enhance the properties and most notably the tensile, flexural and compressive strength of the cement, when the cement is cured. The emulsifying and curing agent used is of a particular kind, namely, a reaction product of a primary or secondary amine with a diglycidyl ether of a polyglycol. Such curing agents are disclosed in my copending applications Ser. No. 873,501, filed Nov. 3, 1969, now abandoned and Ser. No. 53,010, a continuation thereof, filed July 7, 1970.

SUMMARY OF THE INVENTION

It has heretofore been proposed to admix epoxy resins and curing agents with hydraulic cement for the purpose of improving the properties of the cement when cured. This procedure has not proved to be satisfactory, however. Large amounts of epoxy resins and curing agents are required to enhance the properties of the cement significantly, so that the procedure is not economical.

The present invention provides means whereby significant improvements in the properties of hydraulic cement compositions, particularly with respect to tensile, flexural and compressive strength when cured, can be obtained using relatively small amounts of an epoxy emulsion composition comprising an epoxy resin and a specific curing agent for the resin. Moreover, it is known that conventional hydraulic cement composition require that considerably more water be incorporated therein than is necessary to simply hydrate the cement, thereby resulting in the production of a cured cement of decreased strength. The excess water must be incorporated in order that an effective mixture be obtained. This invention also provides a way in which considerably less water need be admixed into the cement composition and yet provide an effective mixture. In addition, this invention provides hydraulic cement compositions which are improved wth respect to slump test and with respect to the time between the initial set and the final set of the cement composition, it being desirable that this time be as short as possible. The time of the initial set is when the cement composition cannot be troweled any more without adverse effects, the art generally desiring this time to be from about 3 to 8 hours. The time of the final set is when forms can be removed.

DETAILED DESCRIPTION OF THE INVENTION

The aforementioned advantages are provided by incorporating into a hydraulic cement composition, for instance a portland cement composition, an aqueous epoxy emulsion composition of an epoxy resin and a curing agent of a particular kind in an amount sufficient to produce an effective cement when the cement is cured.

The epoxy resin can be of any of the wide variety known to the art, including, for example, those made by reacting epichlorohydrin and bisphenol A (generally having an average molecular weight of from 340 to 10,000); those made by reacting epichlorohydrin and tetrachlorobisphenol A (generally having an average molecular weight of from 380 to 11,000); those made by reacting epichlorohydrin and bisphenol A to provide a reaction product which is further admixed with a monoglycidyl ether or a diglycidyl ether to produce a final product having a weight per epoxy group of from 110 to 5000; those made by reacting epichlorohydrin and bisphenol A to provide a reaction product which is further reacted with a hydroxy- or methoxy-terminated silicone resin which has an average molecular weight of from 350 to 7000; and those made by reacting epichlorohydrin and a novolac resin. Epoxy resins suitable for use in this invention are described in "Handbook of Epoxy Resins," Lee & Neville, McGraw-Hill Book Company (1967), sections 2–4 through 2–12.

As is disclosed in my copending application Ser. No. 873,501, filed Nov. 3, 1969, the emusifying and curing agent is a reaction product of a primary or secondary amine with a diglycidyl ether of a polyglycol. Such agents can be represented by the formula:

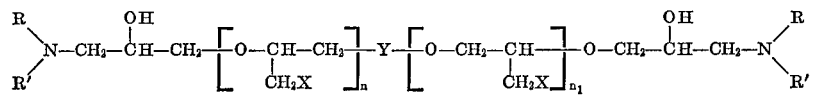

wherein X is chloro or bromo; R is (1) a substituted or unsubstituted, aliphatic or olefinic hydrocarbon radical generally containing from about 2 to about 10 (and preferably 2–6) carbons and wherein addition to hydrogen the substituents can be hydroxy or amino (i.e. —NR″$_2$ wherein R″ is hydrogen or alkyl containing from about 1 to about 6 carbons); (2) substituted or unsubstituted amino where the substituents can be hydrogen, alkyl or cycloalkyl (preferably 1–10 carbons), or acetyl; and (3) heterocyclo aliphatic moieties, where the hetero atom preferably is nitrogen, containing from about 5 to about 8 ring atoms. The foregoing formula is further characterized as containing two reactive hydrogen atoms (i.e. at least two of R or R′ are hydrogen or contain a hydrogen bonded to nitrogen). Illustrative of the radical R are hydroxy ethyl, amino ethyl, amino propyl, butyl amino, hexyl amino, acetyl amino, polyamino ethyl, polypropyl amino, ethyl, propyl, butyl, isobutyl, tertiary butyl, pentyl, isopropyl, hexyl, heptyl, octyl, nonyl, decyl, aminoethylpiperazino, and the like. R′ is hydrogen, alkyl (preferably 1–6 carbons) which can be substituted with hydroxy or amino (as defined above) groups. Exemplary of R′ are methyl, ethyl, hydroxy ethyl, amino ethyl, propyl, hydroxy propyl, amino propyl, butyl, sec-butyl, pentyl, hexyl, and the like. Still referring to the preceding formula, Y is the residue from a saturated or unsaturated polyol having the structure —OZ—, wherein the oxygen atom is bonded directly to the —CH$_2$— in the formula. Z can be a saturated or olefinic hydrocarbon chain containing from 2 to 14 carbon atoms. Also, Z can be a saturated or olefinic carbon chain substituted with halogen atoms (e.g. chlorine or bromine or both) alone, or, additionally, with hydrogen atoms. Z can be linear in structure or branched in structure and can contain saturated or unsaturated rings as long as each terminal carbon atom in Z is aliphatic. Z can also be a polyglycol residue of the structures

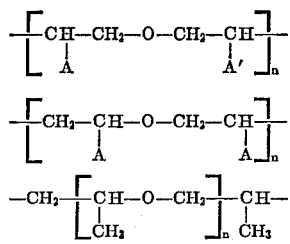

wherein A and A' can be the same or different and can be hydrogen or a saturated or olefinic hydrocarbon radical of from 2 to 6 carbon atoms which can be linear or branched. In all formulas, $n$ and $n_1$ are the same or different whole integers from 0 to 12.

As discussed, the hydraulic cement compositions of this invention have admixed therein an epoxy emulsion composition of an epoxy resin and the foregoing curing agent in an amount sufficient to enhance the properties, most notably tensile and compressive strength, of the cement when the cement is cured. The epoxy emulsion composition is prepared by contacting an epoxy resin with the foregoing defined curing agents. The ratio of epoxy resin to curing agent depends upon the epoxy groups present in the epoxy resin and the active hydrogen content of the curing agent. Generally it is desirable to employ one equivalent of epoxy to one equivalent of active hydrogen, i.e. stoichiometric amounts of curing agent to epoxy resin. However, one can employ about ±20% of active hydrogen to epoxy. Another embodiment of this invention comprises an aqueous hydraulic cement composition comprising 0.001–0.25:1 epoxy emulsion composition solids to hydraulic cement solids and containing sufficient water to produce an effective cement composition upon curing. Such effective cement compositions are characterized by one or more of the following properties: improved tensile strength, compressive strength, flexural strength, trowelability, slump, pumpability, and surface laitence.

The water content of the epoxy emulsion compositions used in this invention is that amount of water necessary to produce an oil in water emulsion. More water may be employed for ease of handling.

Varying concentrations of aqueous emulsions containing the epoxy emulsifying compositions of this invention can be employed for admixture with hydraulic cement. For optimum results, these concentrations are generally dependent upon the specific cement employed. However, any aqueous emulsion will produce effective cement compositions upon curing, so long as the ratio of epoxy emulsion solids to cement solids previously stated is employed, and so long as sufficient water to hydrate the cement is present. It is preferred to employ only that amount of water sufficient to produce the enhanced properties described above. As a practical matter, the upper limits of water employed are dictated by the stoichiometry of the particular cement composition with variations within a range of about ±10% by weight of the stoichiometric amount of water required being preferred. Amounts up to about 100% over stoichiometric amounts can readily be employed.

The fact that one can employ approximately stoichiometric amounts of water is one of the advantages of the composition of this invention. Over-hydration is one of the disadvantages of conventional concrete compositions. It reduces the strength of these concrete compositions and as a matter of fact generally deleteriously effects the overall properties of these prior art compositions. The use of essentially stoichiometric amounts of water is an extremely advantageous characteristic of the novel composition of this invention and in the absence of the addition of the emulsifying composition of these compositions cannot be achieved.

Example I (A) The polyglycidyl ether of polypropylene glycol is prepared by reacting one mole (400 gms.) of polypropylene glycol 425 with four moles (370 gms.) epichlorohydrin in the presence of stannic chloride (20 gms.). The glycol and stannic chloride are premixed and heated to 60° C. The epichlorohydrin is added slowly with cooling to maintain a reaction temperature of 55–65° C. for an additional thirty minutes, at which time all of the epichlorohydrin is consumed. The reaction mixture is cooled to 35° C. and two moles of sodium hydroxide (80 gms.) added as an aqueous 50% solution over a period of one hour and at a reaction temperature of 35 to 45° C. The reaction mixture is held an additional thirty minutes after which water (380 gms.) is added and the brine layer allowed to separate. After separation, the organic layer is analyzed for hydrolyzable chlorine and sufficient sodium hydroxide added to the reaction mixture at 35° C. to reduce the final hydrolyzable chlorine content to less than 0.1%. After holding one hour after the sodium hydroxide addition, the reaction mixture is freed of salt and unreacted sodium hydroxide by repeated water washing. The organic layer is freed of water by distillation under reduced pressure to a final temperature of 120° C. at 50 mm. of mercury. The filtered residue is a clear water white liquid having a weight per epoxide of 361 and a hydrolyzable chlorine content of 0.08%. Although this product contains two bound chlorine groups, this product is selected since the method of manufactuure yields predominately the diglycidyl ether with little or no monoglycidyl ether. This product will be designated 400 PGE in further examples.

(B) 250 gms. (2.4 moles) diethylene triamine are weighed into a reaction flask equipped with an agitator, thermometer, condenser and dropping funnel and heated to 60° C. 722 gms. (1 mole) 400 PGE are added dropwise. The reaction is maintained at 60–65° C., cooling as needed. The addition is complete after 2 hours and the reaction mixture is held an additional 2 hours to insure completeness of the reaction. During the reaction period, there is gradual increase in viscosity and a slight change in color from water to light straw. The product, after holding, is soluble in water. For ease in handling, 524 gms. of water are added. The resulting solution has a pH of 10.6 and a theoretical weight per amino hydrogen of 187. The above solution is added in stoichiometric amounts (50 gms.) to bisphenol diglycidyl ether resin having a weight per epoxide of 189 (50 gms.). An immediate water in oil emulsion is formed on mixing. Further small additions of water effect the desired inversion with easy mixing, at which point the resulting oil in water emulsion is further diluted with water without separation at 10% total solids. The resulting emulsion has a pot life of 2 hours and is stable until gelation occurred. The addition of 50 gms. of this 10% by weight emulsion to 100 gms. of portland cement, Type I, was very fluid, representing only half of the amount of water required in a non-emulsion containing cement-water system.

Similar emulsion are prepared using bisphenol diglycidyl ether resins modified with mono epoxide diluents (cresyl glycidyl ether and butyl glycidyl ether). An excellent emulsion is obtained using bisphenol diglycidyl ether resin modified with an aliphatic diglycidyl ether and an aliphatic substituted phenol. This emulsion exhibits the same desired reduction in mixing water requirements. After 28 days wet cure these and the modified concrete of Example I exhibited a 200% increase in compressive strength and 50% increase in tensile strength as compared to the corresponding unmodified concrete (as measured by ASTM Standard Test Nos. C190–63 and C109–64 respectively. All tests referred to herein are in accordance with ASTM standards).

Example II

Triethylene tetramine (2.4 moles) are reacted with 400 PGE (1 mole) using the procedure of Example I, except that 563 gms. of water are used and the resulting solution has a pH of 10.4 and a weight per amino hydrogen of 132. When 36 gms. of this solution are added to 50 gms. of a bisphenol diglycidyl ether resin modified with 15% cresyl glycidyl ether, an excellent emulsion results on inversion which exhibits an emulsion pot life of 50–60 minutes and excellent properties with portland cement, Type I.

Example III

Ethylene diamine (2.4 moles) is reacted with 400 PGE (1 mole) under the conditions of Example I, except that 466 gms. of water are added. The resulting solution has a pH of 10.8 and a weight per amino hydrogen of 175. An excellent emulsion is obtained upon admixing a stoichiometric amount of bisphenol diglycidyl ether resin having a weight per epoxide of 187 with said solution, which on inversion is water dilutable and exhibits the same water reduction properties with cement as found in Example I. The emulsion pot life is between 40 and 120 minutes depending on the epoxy resin used. Upon admixture of 50 gms. of a 10% concentration of said emulsion with portland cement, Type I or Type II, 100 gms., the modified cement properties are as found in Example I.

Example IV

Similar results are obtained using (2.4 moles) pentaethylene hexamine with 722 gms. 400 PGE under the conditions of Example I. The resulting emulsion produced by admixture with stoichiometric amounts of bisphenol diglycidyl ether resin having a weight per epoxide of 187 produces an excellent modified cement when admixed with portland cement, Type IV.

Diethylene triamine is reacted with diglycidyl ethers of 1,4 butanediol, propylene glycol, dipropylene glycol, polyethylene glycol (molecular weight 400), polyethylene glycol (molecular weight 600), diethylene glycol, and 1,6 hexane diol. In all cases, the bound chlorine is equivalent to one chlorine group per molecule. In all evaluations, 2.4 moles of diethylene triamine is reacted with 1 mole of the diglycidyl ether based on weight per epoxide. The reactions are run at 60–65° C. All of these complex amino compounds produce emulsions which in turn produce excellent water reduction with all types of portland cement, i.e. Types I–IV. For example, the emulsions are added to portland cement Type I or Type II as 10% emulsions at a ratio of 50 parts emulsion to 100 parts of portland cement. The resulting mixtures trowels easily and takes initial set in two hours. All show excellent slump properties. After 28 days moist cure, all of the specimens have compressive strength of 190–200% greater than the control and tensile strength of 50–70% greater than the control.

Similar results are obtained when the epoxy emulsification product, formed by reacting polyhydric alcohol diglycidyl ether with an aliphatic polyamine, is admixed with hydraulic cement.

Example V 250 gms. (2.4 moles) of diethylenetriamine are heated to 50–55° C. and 722 gms. (1 mole) 400 PGE added dropwise. The temperature is maintained at 50–55° C. with cooling as needed. The addition is complete in 2 hours. The reaction mixture is held at 50–55° C. an additional 2 hours at which time 524 gms. of water are added and the solution discharged. The resulting product upon addition to bisphenol diglycidyl ether resin, having a weight per epoxide of 180–195, modified with 15% cresyl glycidyl ether (commercially available as Resypox 1307 from the Resyn Corporation of Linden, N.J.) produces an excellent emulsion.

This epoxy emulsion composition, upon admixture with Portland Cement either Type I or Type II, in a 0.05:1.0 solids ratio of said composition to cement produces a concrete upon curing having excellent compressive and tensile strengths.

Example VI

The same conditions as Example V are used except that a reaction temperature of 40–45° C. is employed. The resulting product forms an excellent emulsion with Resypox 1307. The emulsion has a pot life of 2½ hours and produces the same excellent concrete properties upon curing.

Example VII

The same conditions as Example V are used with a reaction temperature of 30–35° C. The addition time is 4–5 hours. The reaction is held an additional 2 hours before dilution and discharge. The product forms an excellent emulsion with Resypox 1307. The emulsion has a pot life of 3 hours and produces concrete properties comparable with the product of Example V.

Example VIII

The same conditions as Example V are used with the exception of a reaction temperature of 70–75° C. The addition requires 1½ hours. The resulting product is slightly darker in color, but produces an excellent emulsion with Resypox 1307. The emulsion pot life is 1 hour. The concrete properties are excellent and have an initial set somewhat faster than the product of Example I.

Example IX

The same reaction conditions as Example V are used at a reaction temperature of 80–85° C. The addition requires 1 hour. The product is darker than that of Example VIII and is slightly hazy while hot after the water addition. The product when cool is clear, but more viscous than Examples V–VIII. The product forms an excellent emulsion with Resypox 1307. The emulsion has a pot life of 20 to 30 minutes. The concrete properties are excellent and set about 50% faster than the product of Example V.

Example X

The same conditions as Example V are used with the exception that an addition temperature of 90–95° C. is employed. The addition time is 1 hour. The product becomes extremely viscous and cannot be reduced with water easily. The product still forms an excellent emulsion with Resypox 1307. The emulsion has a pot life of 15 minutes. The set properties are very fast resulting in more difficult troweling but the cured specimen has excellent compressive and tensile strength properties 70% and 260% respectively greater than the control (i.e. cement without the epoxy emulsification composition).

Example XI

The same conditions as Example V are used with the exception that a reaction temperature of 55–60° C. is employed. Similar results are obtained as in Example V.

Example XII

The same reaction conditions as Example V are used with the exception that addition temperature of 25° C. is employed. The addition time is 9 hours. In addition, the product is held an additional 9 hours before the water is added. The product forms an excellent emulsion with Resypox 1307. The emulsion has a pot life of 3½ hours and produces concrete with excellent properties similar to the product of Example V above.

The generally preferred reaction temperatures are between 25° C. and 95° C. At 25° C., the reaction takes place, but is excessively long. At 95° C., the reaction is fast, but hard to control. The most desired range is 30 to 85° C.

A similar series using butanediol diglycidyl ether (molecular weight 268) reacted with diethylene triamine at various temperatures is set forth in the following example.

Example XIII 268 gms. (1 mole) of butanediol diglycidyl ether is added dropwise to 250 gms. (2.4 moles) diethylene triamine at the temperatures listed in the table below. The reaction mixture is held for 2 hours at the reaction temperature after the addition is complete, with the exception of 25° C. in which case the mixture is held 9 hours after the addition. The products so prepared are added to bisphenol A diglycidyl ether resin having a weight per epoxide of 1% in stoichiometric amounts. Water is added to the mixture to form the desired oil in water emulsion. The epoxy emulsion composition is then added to portland cement Type I in a ratio of 0.05:1 solids of emulsion to solids cement. The results are summarized below:

| Reaction temperature, °C. | Reaction time, hours | Product at 65% in water | Emulsion | Percent Compressive compared to control[1] | Tensile compared to control[1] |
|---|---|---|---|---|---|
| 20-25 | 9 | Clear | Good | 180 | 290 |
| 30-35 | 5½ | do | do | 180 | 280 |
| 50-55 | 2 | do | do | 200 | 300 |
| 60-65 | 2 | do | do | 195 | 300 |
| 70-75 | 1½ | do | do | 190 | 290 |
| 80-85 | 1 | do | do | 175 | 270 |
| 90-95 | 1 | do.[2] | do | 160 | 250 |

[1] The controls comprise the same amount of cement without the emulsion composition admixed. The results as to tensile and compressive strength are reported as percent of control because of the variable strength of unmodified portland cement.

[2] Clear, but very viscous.

The following examples demonstrate the use of amines, such as dimethyl ethanol amine in the reaction. Such amines tend to improve wetting in non-aqueous systems. In the following examples (Examples XIV–XXV) butanediol diglycidyl ether (total chlorine content of 9.55% and molecular weight of 268) is reacted with various amines after which dimethyl ethanol amine is added. In all cases, the emulsions formed are added to portland cement Type I at a level of 5 parts of emulsion solids to 100 parts of cement.

Example XIV 220 gms. (2.13 moles) of diethylene triamine is heated to 50–55° C. and 268 gms. of the above defined butanediol diglycidyl ether is added dropwise in 2 hours. The reaction mixture is held 2 hours at 50–55° C. and 36 gms. of dimethyl ethanol amine is added. The product has a weight per amino hydrogen of 65.5 and when diluted to 65% solids with water, forms an excellent emulsion with a commercial bisphenol A diglycidyl ether resin having a weight per epoxide range of 180–190 (Resypox 1626 from the Resyn Corporation of Linden, N.J.) and produces concrete mixtures with 50% water reduction and compressive and tensile properties of 70 and 250% increase respectively as compared to the control without the epoxy emulsion composition.

Example XV 380 gms. (2.01 moles) of tetraethylene pentamine are reacted under the same conditions as Example XIV. After the hold period, 36 gms. of dimethyl ethanol amine are added. The product has a weight per amino hydrogen of 57. When diluted to 65% solids with water, the product forms an excellent emulsion with Resypox 1626 and produces concrete properties similar to Example XIV.

Example XVI 240 gms. (2.1 moles) of 1,6 hexanediamine are reacted under the same conditions as Example XIV. After the hold period, 36 gms. of dimethyl ethanol amine are added. The product has a weight per amino hydrogen of 91. The product when reduced to 65% solids with water forms an excellent emulsion with Resypox 1626. These emulsions have a short pot life (15 minutes) but form concrete properties similar to Example XIV.

Example XVII 210 gms. (2.01 moles) of amino ethyl amino ethanol are reacted under the same conditions as Example XIV above. After the hold period, 36 gms. of dimethyl ethanol amine are added. The product has a weight per amino hydrogen of 128. The product forms an excellent emulsion with Resypox 1626. These emulsions form concrete mixtures similar to Example XIV above, but the rate of set of these mixes is somewhat slower at room temperature.

Example XVIII 130 gms. (2.17 moles) ethylene diamine are reacted under the same conditions as Example XIV. After the hold period, 36 gms. of dimethyl ethanol amine are added. The crystalline product has a weight per amino hydrogen of 72. Excellent emulsions are obtained when the product, diluted to 80% solids with water, is added to Resypox 1626. These emulsions have good properties with cement, but cure slower at room temperature than the product of Example XIV.

Example XIX 300 gms. (2.06 moles) of triethylene tetramine are reacted under the same conditions as Example XIV above. After the hold period, 36 gms. of dimethyl ethanol amine are added. The product has a weight per amino hydrogen of 60. The product when reduced to 65% solids with water forms excellent emulsions with Resypox 1626. The resulting mixtures with portland cement are similar to the product of Example XIV above.

Example XX 260 gms. (2.01 moles) of amino ethyl piperazine are reacted under the same conditions as Example XIV. After the hold period, 36 gms. of dimethyl ethanol amine are added. The product has a weight per amino hydrogen of 141. The product, when diluted to 65% solids, forms excellent emulsions with Resypox 1626. The resulting mixture with cement has excellent cure.

Example XXI 125 gms. (2.05 moles) of mono ethanol amine are reacted under the same conditions as Example XIV above. After the hold period, 36 gms. of dimethyl ethanol amine are added. The resulting product has a weight per amino hydrogen of 214. The product forms excellent emulsions with Resypox 1626. The resulting emulsion shows the same water reduction, and increase in tensile and compressive strength as the product of Example XIV.

Example XXII 270 gms. (2.1 moles) of diethyl amino propyl amine are reacted under the same conditions as Example XIV. After the hold period, 36 gms. of dimethyl ethanol amine are added. The product has a weight per amino hydrogen of 287. The product, when reduced to 75% with water, forms excellent emulsions with Resypox 1626. The resulting cure with cement is similar to Example XIV.

Example XXIII 125 gms. (1.20 moles) of amino ethyl ethanol amine and 125 gms. (1.20 moles) of diethylene triamine are reacted under the same conditions as Example XIV above. After the hold period, 36 gms. of dimethyl ethanol amine are added. The product has a weight per amino hydrogen of 73. When reduced to 65% solids with water, the product forms excellent emulsions with Resypox 1626. The resulting mixture with portland cement has excellent cure.

When Examples XIV–XXIII are repeated without dimethyl ethanol amine, the cement mixtures formed using the epoxy emulsions produced thereby are of similar quality. In Examples XIV–XXIII the dimethyl ethanol amine is added to the product after the reaction. In the following example dimethyl ethanol amine is added at the beginning of the reaction.

Example XXIV 220 gms. (2.13 moles) of diethylene triamine and 36 gms. of dimethyl ethanol amine are heated to 50 to 55° C. 268 gms. (1.0 mole) of butanediol diglycidyl ether is added dropwise over a period of 2 hours. The reaction mixture is held an additional 2 hours at 50 to 55° C. The product has a weight per amino hydrogen of 65.5 and when diluted to 65% solids with water, forms an excellent emulsion with Resypox 1626. The cement mixture prepared from these emulsions has excellent trowelability and cure.

The following examples demonstrate that a substituted phenol can also be used in non-aqueous systems to improve cure.

Example XXV 220 gms. (2.13 moles) of diethylene triamine are heated to 50 to 55° C. 268 gms. (1 mole) of butanediol diglycidyl ether are added dropwise over a 2 hour period. The reaction mixture is held an additional 2 hours at 50 to 55° C. and 60 gms. of nonyl phenol added. The product has a weight per amino hydrogen of 63 and, when diluted to 65% solids with water, forms excellent emulsions with Resypox 1626. The pot life of the emulsion and the cure of the cement mixture were not noticeably altered by the addition of nonyl phenol.

Example XXVI

Example XXV is repeated using the same conditions except 722 gms. 400 PGE are used in place of butanediol diglycidyl ether. The product when diluted to 65% solids with water forms excellent emulsions with Resypox 1626. The pot life and the cure of the cement mixture are not noticeably altered by the addition of nonyl phenol.

In an evaluation of the effect of the combination of tertiary amine and substituted phenol, e.g. dimethyl amine and nonyl phenol with butanediol diglycidyl ether and diethylene triamine, the conditions of Example XXV are repeated. After the hold period, 36 gms. of dimethyl ethanol amine and 60 gms. of nonyl phenol are added. The product, when reduced to 65% solids with water, forms excellent emulsions with conventional epoxy resins. The cement mixtures have excellent trowelability and cure slightly faster than those not containing dimethyl ethanol amine and nonyl phenol. The pot life is also shorter by 10%.

The complex amines of this invention form emulsions with epoxy resins when used in the anhydrous condition. It is preferred that water be added slowly with mixing until the inversion point is reached. This normally occurs at a water to resin ratio of 35 to 50 gms. of water per 100 gms. of conventional epoxy resin. The preferred emulsion from the standpoint of mixing, dilution and ease of formation occurs when the complex amines contain 20 to 40% water prior to mixing and have a viscosity of 3,000 to 10,000 cps. These are the most preferred levels.

Example XXVII

The complex amine prepared from diethylene triamine and polyglycidyl ether 400 PGE in accordance with the procedure of Example I is used to emulsify and cure a fire retardant resin, prepared by blending Resypox 1628 (a bisphenol-A diglycidyl ether resin having weight per epoxide of 185–195, available commercially from Resyn Corporation of Linden, N.J.) with the diglycidyl ether of tetra bromobisphenol-A in equal amounts. The epoxy emulsion thus prepared upon admixture with portland cement Type I of Type II at a level of 0.02 parts of emulsion solid to 1 part of cement renders a cement possessing excellent cure characteristics.

Example XXVIII

A silicone epoxy resin was prepared by reacting a conventional silicone intermediate with an epoxy resin containing 1.6 equivalents per kilogram of hydroxyl groups (Resypox 1634, a bisphenol diglycidyl ether having a molecular weight of approximately 500) as follows:

Charge 625 gms. Resypox 1634 and 257 gms. 6188 (Dow Corning), a silicone resin having a molecular weight of approximately 750, to a flask equipped with a thermometer, agitator, condenser and vacuum take-off. The mixture is heated to 70° C. and the agitator started. Heating is continued to 180° C. at full vacuum (50 mm. mercury) and held for 3 hours. The reaction product is cooled to 100° C. and 350 gms. of butanediol diglycidyl ether is added. The mixture is reheated to 180° C. and held for 2 hours under vacuum (50 mm. mercury). The product is allowed to cool to room temperature and 5 parts per hundred of nonyl phenol are added. The product has an epoxy value of 3.9 equivalents per kilogram. This product is emulsified using the complex amine prepared from diethylene triamine and 400 PGE. The resulting emulsion is excellent. Cement mixtures containing a ratio of 0.05 parts of emulsion solids to 1 part of portland cement Type I or Type II possess exceptional cure properties.

Example XXIX

The diglycidyl ether of dibromobutane diol is prepared in the conventional manner by reacting with epichlorohydrin and stannic chloride followed by dehydrohalogenation with caustic and purification. This product is blended with a conventional epoxy resin in equal amounts. The blend has a weight per epoxy of 256 and total halogen content of 19%. This blend is emulsified with the complex amine used in Examples XXVII and XXVIII. The emulsion is excellent and cement mixtures at a ratio of 0.05 parts of emulsion solid to 1 part of portland cement Type I prepared from the emulsion possess exceptional cure properties.

Example XXX

The diglycidyl ether of dibromobutane diol having a weight per epoxide of 200 and total halogen content of 36% is reacted with 2.4 moles of diethylene triamine at 50 to 55° C. in accordance with the procedure of Example V, except that the amount of water is reduced to 350 gms. The resulting product forms excellent emulsions with conventional epoxy resins. Cement mixtures prepared from these emulsions at the same ratios of Example XXIX have exceptional cure.

In the following example, the ratio of emulsion solids to portland cement is varied. In all cases, the percent water reduction, percent increase or decrease in tensile and compressive strength and trowelability are compared to the control containing no epoxy emulsion composition. Percentages are used since the actual values for the control varied widely. Tensile and compressive strengths are determined after 28 days moist cure. In all determinations, 3 parts of bank sand to 1 part of portland cement Type I is used. Since similar results on all systems are observed at 5 parts of emulsion solids to 100 parts of portland cement, Type I, only one epoxy emulsion system is used in this study; a liquid bisphenol A-epichlorohydrin resin prepared in the conventional manner having a weight per epoxide of 190 is emulsified with a complex amine based on amino ethyl piperazine and butanediol diglycidyl ether prepared in accordance with the procedure of Example XV. The emulsion formed is further reduced with water to 30% solids and added to 100 parts of portland cement Type I and 300 parts bank sand to obtain various emulsion solids levels. Additional water is added to obtain a stiff, trowelable mix. The resulting mixes are evaluated for water requirements, trowelability, tensile strength and compressive strength, the latter two properties, after 28 days moist cure. The results of these evaluations are tabulated below:

Example XXXI

| Emsusion solids content, parts per 100 parts | Percent | | | |
|---|---|---|---|---|
| | Water requirement [1] | Tensile strength [2] | Compressive strength [2] | Trowelability |
| 0.1 | 97 | 95 | 90 | Fair. |
| 0.3 | 70 | 130 | 120 | Good. |
| 0.5 | 60 | 180 | 150 | Do. |
| 0.7 | 55 | 240 | 170 | Do. |
| 1.0 | 55 | 260 | 190 | Do. |
| 2.0 | 50 | 295 | 205 | Excellent. |
| 5.0 | 50 | 300 | 200 | Do. |
| 7.5 | 48 | 295 | 200 | Do. |
| 10.0 | 48 | 310 | 190 | Good. |
| 12.5 | 46 | 300 | 195 | Fair. |
| 15.0 | [3] 45 | 500 | 300 | Fair to poor. |
| 20.0 | [4] 34 | 500 | 400 | Impossible. |

[1] Using 100% as control.
[2] Percent of control.
[3] Lowest water content to hydrate cement.
[4] Cure due to resin; insufficient water to hydrate the cement.

In the foregoing example the preferred minimum level of epoxy emulsion solids is 0.3 part per 100 parts of cement. The maximum level from the standpoint of trowelability is 15 parts of emulsion solids per 100 parts of cement. At higher levels, the low water content causes only partial hydration of the cement and cure is due to the resin-hardener system completely. The partially hydrated cement functions as a filler or pigment. Water reduction results from the use of the epoxy emulsion system. The generally preferred limits are from 0.1 to 15.0 parts of emulsion solids per 100 parts of cement with the most preferred range being 1.0 to 10.0 parts per 100 parts of cement. From the standpoint of cost, the lower end of this range is the most desirable.

The following example demonstrates the use of several diglycidyl ethers, possessing varying total chlorine contents, which are used in the preparation of complex amines.

Example XXXII

One mole of butanediol is reacted with from 2 to 12 moles of epichlorohydrin in the presence of stannic chloride, followed by dehydrohalogenation with sodium hydroxide. The resulting diglycidyl ethers contain from less than about 1 to about 10 bound chlorine groups. (It is not possible, by this reaction technique, to obtain a chlorine free diglycidyl ether without repeated molecular distillations.) Complex amines are prepared from these diglycidyl ethers by reacting 1 mole of the above ether products, containing various amounts of bound chlorine (defined in the following table) based on the weight per epoxide (assuming two epoxide groups per molecule), with 2.01 moles of amino ethyl piperazine in the manner described in Example XIX. The resulting complex amines are then used to emulsify a conventional bisphenol A-epichlorohydrin epoxy resin (weight per epoxide of 190) using the stoichiometric amount of complex amine based on the weight per amino hydrogen. These emulsions are reduced to 10% resin-hardener solids and added to portland cement Type II at a ratio of 5 parts of resin-hardener solids per 100 parts of cement and 300 parts of washed bank sand. These mixtures were then evaluated as in Example XXXI.

| Chlorine content | Percent | | | |
|---|---|---|---|---|
| | Water requirement [1] | Tensile strength [2] | Compressive strength [2] | Trowelability |
| 5.2 | 49 | 250 | 172 | Excellent. |
| 9.55 | 50 | 300 | 200 | Do. |
| 12.6 | 48 | 337 | 227 | Do. |
| 18.9 | 49 | 342 | 230 | Do. |
| 22.7 | 51 | 347 | 233 | Do. |
| 25.3 | 52 | 351 | 236 | Do. |
| 28.7 | 54 | 349 | 237 | Do. |

[1] Using 100% as control.
[2] Percent of control.

The presence of halogen, although not necessary for water reduction and strength improvement, is not detrimental to the emulsion system, and produces even greater strength improvement particularly in the range of about 5 to about 18% by weight chlorine content.

The compositions of this invention can be formulated with a wide variety of aggregates, ranging from fines to coarse, to produce concretes of varying applications. In general any aggregate derived from igneous, sedimentary or metamorphic rock or manufactured from clays, shales, slates and slags can be used. Exemplary are natural sands, gravels, and crushed stone. Lightweight aggregates manufactured from clays, shales, slates and slags can be utilized and are especially preferred in concrete, such as prestressed concrete, for construction purposes. The concrete compositions of this invention can further contain other admixtures, i.e. a material added to the concrete at the time of mixing to impart special properties. Exemplary of admixtures are accelerators, retarders, air-entraining agents, workability agents, damp-proofing and permeability-reducing agents, pozzolans, color pigments, and other miscellaneous materials conventionally employed in the concrete industry. Thus, any of the foregoing examples of this invention can be modified by the addition of such aggregate materials and admixtures to produce the novel improved concrete compositions of this invention for a wide variety of end use applications as is common knowledge and known to those skilled in the art.

The following exampels demonstrate the use of the novel cement compositions of this invention to produce concrete using various aggregates.

Example XXXIII

An admixture is prepared containing 1080 pounds of sand, 720 pounds of expanded shale, 95 pounds portland cement Type I and 73 pounds of silica flour. To this admixture is added 12 gallons of water containing 1.68 pounds of emulsion solids. This emulsion is produced in accordance with the procedure of Example XX, using Resypox 1626, in stoichiometric amounts with the complex curing agent of Example XX. The emulsion so formed is reduced to 10 percent emulsion solids with water. This is further reduced to obtain the desired emulsion-water content for this cement mixture. An identical mixture is prepared without the emulsion solids. In this example 15.5 gallons of water are required. From this cement mixture standard 8" x 8" x 16" concrete blocks are prepared. After preparation the blocks are autoclaved and tested after 42 hours for compressive strength in accordance with ASTM standards. The control block has a weight of 30.8 pounds, a total compressive strength of 176,000 pounds, or 1477 p.s.i. compressive strength. The concrete blocks containing the emulsion of this invention is a weight of 30.5 pounds, a total compressive strength of 269,000 pounds, or a compressive strength of 2258 p.s.i.

EXAMPLE XXXIV

An admixture is prepared containing 1739 pounds of sand, 298 pounds of limestone, 107 pounds of portland cement, Type I, and 50 pounds of silica flour. To this admixture is added 5 gallons of water containing 1.57 pounds of emulsion solids. The emulsion composition of this example is the same as in Example XXXIII. An identical mixture of sand, limestone, portland cement and silica flour to which only water is added is used as a control. The control required 8.8 gallons of water. From the above cement, test blocks 8" x 8" x 16" are cast. These blocks contain 119.14 square inches of stacking surface. After casting, the blocks are autoclaved and tested after 42 hours. The control block weights 37.4 pounds and has a compressive strength of 1900 p.s.i. The block containing the emulsion of this invention has a weight of 37.0 pounds and compressive strength of 2634 p.s.i.

The foregoing discussion has concerned the use of hydraulic cements in the novel compositions of this invention. In addition to hydraulic cements, gypsum and plaster of Paris or white cement can be employed either as an adduct to the compositions of this invention or as a substitute for hydraulic cement in these compositions. When these materials are employed as substitute or replacement for the hydraulic cement constituent of the equivalent ratios, i.e. 0.001–0.25:1 emulsion solids to cement solids (gypsum, plaster of Paris, white cement). Other cements which can be employed in this invention are exemplified by ferro cement and high aluminite cement.

An embodiment of this invention encompasses an epoxy resin-cement composition wherein the cement is employed as a filler in producing a highly filled cured epoxy resin system. Exemplary of such systems are those employing ratios of emulsifying composition solids to cement solids of greater than 0.25:1.

I claim:

1. A hardenable cement composition comprising a hydraulic cement composition having admixed therein an aqueous emulsion composition containing an epoxy resin and curing agent in an amount sufficient to produce an effective cement when the cement is cured, said curing agent having the following general formula

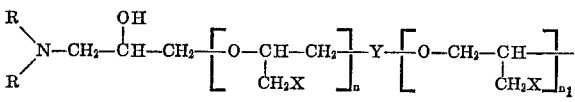

wherein R is (1) a hydrocarbon radical containing from about 2 to about 10 carbons and wherein in addition to hydrogen the substituents can be hydroxy or amino; (2) amino where the substituents are hydrogen, alkyl or cycloalkyl containing from about 1 to about 10 carbons, or acetyl; or (3) heterocycloaliphatic moieties, where the hetero atom is nitrogen, containing from about 5 to about 8 rings atoms; R' is hydrogen, alkyl containing from about 1 to about 6 carbons which can be substituted with hydroxy or amino; X is chloro, bromo or fluoro; Y has the structure OZ, as being the residue from a saturated or unsaturated polyol in which each terminal carbon of Z is aliphatic; and $n$ and $n_1$ are the same or different integers from 0–12; said agent containing at least two reactive hydrogen.

2. The composition of claim 1 wherein R in said curing agent is hydroxy ethyl, amino ethyl, amino propyl, butyl amino, hexyl amino, acetyl amino, polyamino ethyl, polypropyl amino, ethyl, propyl, butyl, isobutyl, tertiary butyl, pentyl, isopropyl, hexyl, heptyl, octyl, nonyl, decyl or aminoethylpiperazino.

3. The composition of claim 1 wherein R' in said curing agent is methyl, ethyl, hydroxy ethyl, amino ethyl, propyl, hydroxy propyl, amino propyl, butyl, sec-butyl, pentyl or hexyl.

4. The composition of claim 1 wherein R in said curing agent is hydroxy ethyl, amino ethyl, amino propyl, butyl amino, hexyl amino, acetyl amino, polyamino ethyl, polypropyl amino, ethyl, propyl, butyl, isobutyl, tertiary butyl, pentyl, isopropyl, hexyl, heptyl, octyl, nonyl, decyl or aminoethylpiperazino, and R' is methyl, ethyl, hydroxy ethyl, amino ethyl, propyl, hydroxy propyl, amino propyl, butyl, sec-butyl, pentyl or hexyl.

5. The composition of claim 1 wherein X in said curing agent is chloro.

6. The composition of claim 4 wherein X in said curing agent is chloro.

7. The composition of claim 1 wherein said curing agent is substituted at a carbon bonded hydrogen with loweralkyl, aryl, a cycloaliphatic group containing from about 5 to about 7 carbons or a heterocycloaliphatic group containing from about 5 to about 8 ring atoms.

8. The composition of claim 2 wherein X in said curing agent is chloro.

9. The composition of claim 3 wherein X in said curing agent is chloro.

10. The composition of claim 4 wherein X in said curing agent is chloro.

11. A hardenable cement composition comprising a hydraulic cement composition and 0.001–0.25 part of combined epoxy resin and curing agent per part of hydraulic cement solids and containing sufficient water to produce an effective cement composition upon curing; said emulsion composition comprising an epoxy resin and a curing agent of the following general formula

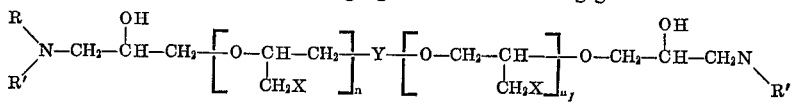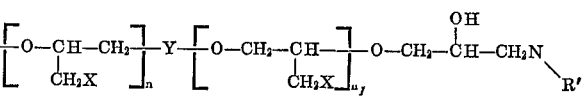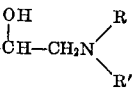

wherein R is (1) a hydrocarbon radical containing from about 2 to about 10 carbons and wherein in addition to hydrogen the substituents can be hydroxy or amino; (2) amino where the substituents are hydrogen, alkyl or cycloalkyl containing from about 1 to about 10 carbons, or acetyl; or (3) heterocycloaliphatic moieties, where the hetero atom is nitrogen, containing from about 5 to about 8 ring atoms; R' is hydrogen, alkyl containing from about 1 to about 6 carbons which can be substituted with hydroxy or amino; X is chloro, bromo or fluoro; Y has the structure OZ, as being the residue from a saturated or unsaturated polyol in which each terminal carbon of Z is aliphatic; and $n$ and $n_1$ are the same or different integers from 0–12; said agent containing at least two reactive hydrogens.

12. The composition of claim 11 wherein the cement is portland cement.

13. The composition of claim 11 wherein the cement is calcium aluminate.

14. The composition of claim 11 wherein the cement is composed of a gypsum.

15. The composition of claim 1 wherein said epoxy resin has a molecular weight of from about 300 to about 10,000.

16. The composition of claim 1 wherein said epoxy resin is a diglycidyl ether resin having a weight per epoxide from about 100 to about 5000.

17. The cured product of claim 1.
18. The cured product of claim 6.
19. The cured product of claim 11.
20. The cured product of claim 16.

References Cited

UNITED STATES PATENTS

| | | | |
|---|---|---|---|
| 2,651,589 | 9/1953 | Shokal et al. | 260—47 EN |
| 2,921,050 | 1/1960 | Belanger | 260—47 EP |
| 3,310,511 | 3/1967 | Reinert | 260—29.2 EP |
| 3,449,278 | 6/1969 | McKay et al. | 260—29.2 EP |
| 3,477,979 | 11/1969 | Hillyer | 260—29.2 EP |

FOREIGN PATENTS

| | | | |
|---|---|---|---|
| 217,363 | 9/1961 | Austria | 260—29.2 EP |

MURRAY TILLMAN, Primary Examiner

A. H. KOECKERT, Assistant Examiner

U.S. Cl. X.R.

260—37 EP

UNITED STATES PATENT OFFICE
CERTIFICATE OF CORRECTION

Patent No. 3,769,250        Dated October 30, 1973

Inventor(s) Otho Leroy Nikles, Jr.

It is certified that error appears in the above-identified patent and that said Letters Patent are hereby corrected as shown below:

Column 1, line 60, "wth" should read --with--

Column 2, line 22, "book of Epoxy Resins," should read --book of Epoxy Resins",--

Column 3, second brackets, "A", second occurrence, should read -- A' --.

Column 4, line 62, "emulsion" should read --emulsions--

Column 10, line 1, "Type I of Type II" should read --Type I or Type II--

Column 11, first heading in Example XXXI, "Emsusion" should read --Emulsion--

Column 12, line 29, "exampels" should read --examples--

Column 12, line 71, "weights" should read --weighs--

Column 13, an insert between lines 8 and 9 should read --compositions of this invention they are employed in--

Column 13, first lower substituent in formula should read --R'--

Column 13, line 50, "active hydrogen" should read --active hydrogens--

Column 14, Claim 10, should read --The composition of claim 7 wherein X in said curing agent is chloro--

UNITED STATES PATENT OFFICE
CERTIFICATE OF CORRECTION

Patent No. 3,769,250      Dated October 30, 1973

Inventor(s) Otho Leroy Nikles, Jr.      Page - 2

It is certified that error appears in the above-identified patent and that said Letters Patent are hereby corrected as shown below:

SECOND PAGE OF CORRECTIONS

Column 14, line 11, "part" should read --parts--

Column 14, "$-CH_2N\begin{smallmatrix}\\ \searrow R'\end{smallmatrix}$" should read --$-CH_2N\begin{smallmatrix}\nearrow R\\ \searrow R'\end{smallmatrix}$--

Signed and sealed this 26th day of March 1974.

(SEAL)
Attest:

EDWARD M. FLETCHER, JR.
Attesting Officer

C. MARSHALL DANN
Commissioner of Patents